Jan. 10, 1961   L. S. JAWORSKI   2,967,556
SHEET METAL SCREW FASTENER WITH EDGEWISE
FLEXIBLE PANEL ENGAGING ARMS
Filed April 16, 1959   2 Sheets-Sheet 1
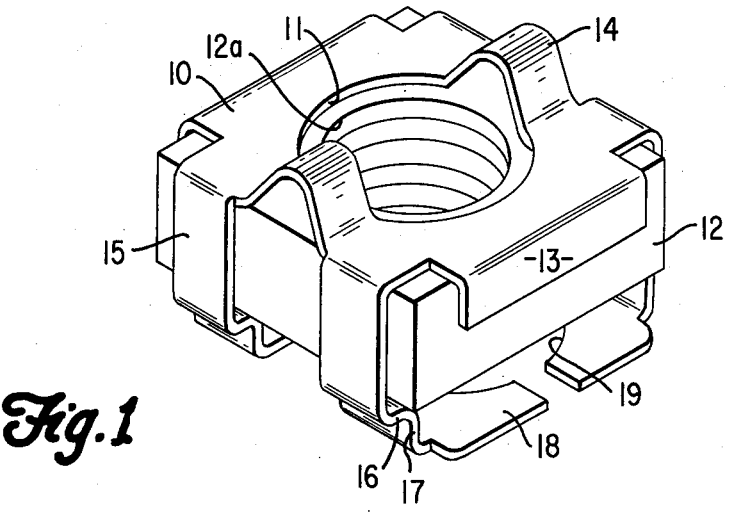
*Fig. 1*
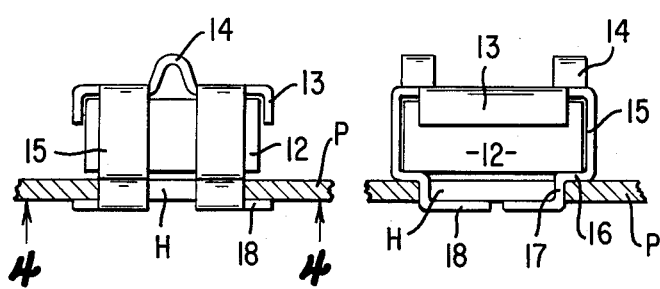
*Fig. 2*   *Fig. 3*
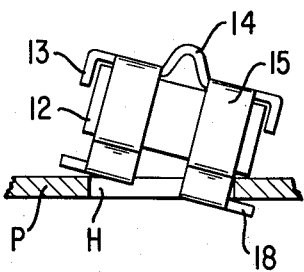
*Fig. 5*
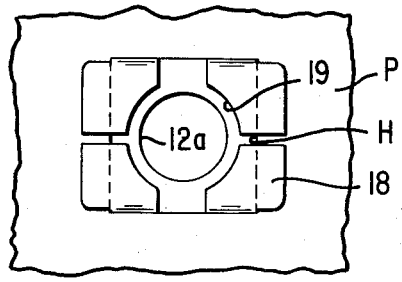
*Fig. 4*
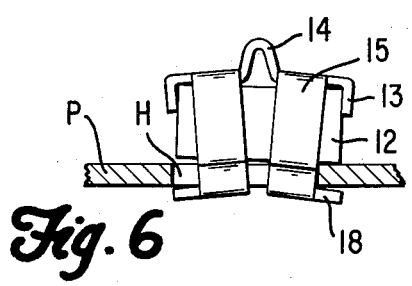
*Fig. 6*
INVENTOR.
LEONARD S. JAWORSKI
BY
*Malcolm W. Fraser*
ATTORNEY

INVENTOR.
LEONARD JAWORSKI
BY
ATTORNEY

United States Patent Office 2,967,556
Patented Jan. 10, 1961

2,967,556

SHEET METAL SCREW FASTENER WITH EDGEWISE FLEXIBLE PANEL ENGAGING ARMS

Leonard S. Jaworski, Toledo, Ohio, assignor to Prestole Corporation, Toledo, Ohio, a corporation of Michigan Filed Apr. 16, 1959, Ser. No. 806,958

2 Claims. (Cl. 151—41.75)

This invention relates to fastening devices but more particularly to sheet metal fasteners for mounting in an aperture of a supporting panel, such for example as cage nuts in which the nut body is enclosed in a spring metal holder which is adapted to be snapped into a supporting panel aperture.

An object is to produce a fastener of the above type which has spring arms, which can resiliently flex edgewise for snapping into the panel aperture thus to enable the body to be on one side of the panel and extensions on the spring arms to overlap the opposite side of the panel.

Another object is to produce a sheet metal screw-receiving device having the unique features of construction, and operation hereinafter described.

Other objects and advantages of the invention will hereinafter appear and, for purposes of illustration but not of limitation, an embodiment of the invention is shown on the accompanying drawings in which:

Figure 1 is a top perspective view of the cage nut;

Figure 2 is a side elevation of the cage nut mounted in a supporting panel;

Figure 3 is an end view of the cage nut mounted in the supporting panel;

Figure 4 is a bottom plan view of the cage nut mounted in the supporting panel, taken on the line 4—4 of Figure 2;

Figures 5 and 6 are side elevations showing the steps by which the cage nut is applied to the supporting panel;

Figure 7 is a perspective view of an alternate form of cage nut in which the arched spring portions of Figures 1 to 6 are dispensed with.

Figure 7:
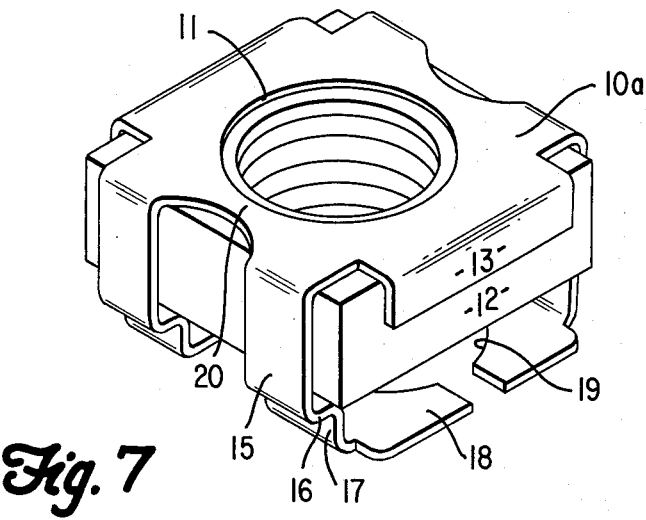

The illustrated embodiment of the invention comprises a cage nut having a body 10 of spring metal and provided with a central hole 11. The body is flat and abuts a square nut 12 having a screw threaded hole 12a substantially in registry with the hole 11. The body 10 is provided with integral downturned end flanges 13 which overlap the ends of the nut 12 and extend downwardly for a portion of the thickness of the nut. The flat end portions of the body are integrally connected with upwardly arched substantially V-shaped connecting portions 14 which serve as spring devices for a purpose hereinafter described.

Integral with each side of the body 10 is a pair of flat side arms 15 disposed at substantially right angles to the body, the arms being arranged on opposite sides of the respective V-shaped spring portions 14. The downturned arms 15 engage the adjacent sides of the nut 12. Adjacent the lower edge of the nut, each arm is formed with an inwardly bent shoulder portion 16 which extends a slight distance beneath the nut and terminates in a right angular downwardly extending portion 17, the length of which is of the order of the thickness of the panel to which the cage nut is applied. Integral with the lower end of the portions 17 are inwardly extending flat feet 18. These feet terminate in flat ends which are spaced slightly from each other and are formed with curved inner edges 19, generally concentric with the threaded bore 12a of the nut 12. It will be observed that the outer sides of the feet 18 project laterally outwardly beyond the adjacent ends of the nut 12.

The cage nut is mounted in a square or rectangular opening in a supporting panel and, as shown, the panel P is formed with a square hole H in which the cage nut is mounted. In order to mount the cage nut in the hole and as shown in Figure 5 the cage nut is tilted so that a pair of the feet 18 may be extended through the hole to be disposed generally beneath the under side of the panel P. Then by manually exerting pressure on the cage nut in order to flex such arms 15 rearwardly, the other pair of arms are admitted into the hole H to position the feet on the other arms on the opposite side of the panel P. Upon release of the pressure against the nut the resilience afforded by the spring devices 14 cause the arms to spread outwardly and the cage nut assumes the position shown in Figure 2 in which the nut 12 overlies the hole H and is disposed on one side of the panel P and the feet flatly engage the opposite side of the panel.

It will be noted that the flexure of the arms 15 is edgewise and adequate resilience is afforded by the reservoir or spring device in the form of arched portions 14 which permit the edgewise movement of the arms and exert adequate spring tension thereagainst to cause them to snap into engaged position. The edgewise resilient flexing of the feet carrying arms 15 is of importance in that it enables a fastener to be constructed with a short distance between the engaging feet 18 and the base of the nut 12 so that the nut lies more closely to the top surface or face of the supporting panel P.

The alternate form shown in Figure 7 shows a cage nut which is identical in all respects to that illustrated on Figures 1 to 6 except for the elimination of the arched spring portions 14. In this instance the plate 10a is formed with relatively narrow bridge portions 20 which connect the depending arms 15. Adequate flexibility and resilience for the arms 15 are afforded in this construction, the bridge portions, which, although flat, nevertheless impart the desired spring action in the edgewise movements of the arms 15, not only to enable the necessary flexure in mounting the cage nut in the panel aperture but also for retaining it in applied position.

Figure 8:
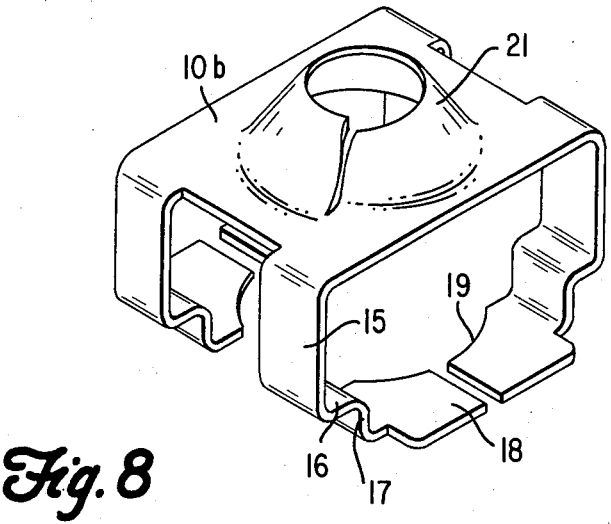
Figure 8 is a perspective view of an alternate form in which an integral nut impression is formed in the fastener.

As shown in Figure 8, the base plate 10b is formed with an integral nut impression 21, which as shown is the well known Prestole nut and may be in accordance with United States Patent 2,831,388, dated April 22, 1958. Otherwise this fastener is substantially identical with that above described, the same reference numerals being employed.

Numerous changes in details and construction of arrangement and operation may be effected without departing from the spirit of the invention especially as defined in the appended claims.

What I claim is:

1. A fastener comprising a spring metal body, screw engaging means associated with the body, pairs of laterally spaced flat parallel arms on opposite sides of and integral with said body and depending at substantially right angles thereto, a relatively narrow strip forming part of the body and providing an integral connection between each pair of arms, an integral extension on the outer end of each arm projecting inwardly a short distance at substantially right angles thereto and then projecting downwardly a short distance parallel to the respective arm, a plate-like foot integral with the lower end of each extension and disposed generally parallel to said body and at right angles to the respective extension and extending inwardly toward and terminating close to and in alignment with the respective foot on the opposite side, each foot having a portion projecting laterally outward beyond the body to form with the adpacent portion of said arm extension a hook portion whereby the fastener is applied to an apertured supporting panel by introducing the hook portions of the feet of oppositely disposed arms into the panel aperture and against an edge thereof and by imparting pressure to the fastener, the respective arms are flexed edgewise to enable entry of the other pair of hook portions into the aperture and upon release thereof opposite pairs of feet resiliently engage opposite edge portions of the panel aperture with the plate-like feet arranged on one side of the panel and the inwardly projecting extensions of the arms disposed on the opposite side of the panel.

2. A fastener comprising a spring metal body having a flat top panel provided with a central aperture, pairs of laterally spaced flat parallel arms on opposite sides of and integral with said body panel and depending at substantially right angles thereto, a relatively narrow upwardly arched strip forming part of the body panel and providing an integral connection between each pair of arms, an integral extension on the outer end of each arm projecting inwardly a short distance at substantially right angles thereto and then projecting downwardly a short distance parallel to the respective arm, a nut loosely fitting said body with its threaded hole in registry with the aperture in the body panel, said nut resting on the inwardly projecting extensions of said arms, flanges on said body panel to assist in retaining the nut within the body, a plate-like foot integral with the lower end of each extension and disposed generally parallel to said body panel and at right angles to the respective extension and extending inwardly toward and terminating close to and in alignment with the respective foot on the opposite side, each foot having a portion projecting laterally outward beyond the nut to form with the adjacent portion of said arm extension a hook portion whereby the fastener is applied to an apertured supporting panel by introducing the hook portions of the feet of oppositely disposed arms into the panel aperture and against an edge thereof and by imparting pressure to the fastener, the respective arms are flexed edgewise to enable entry of the other pair of hook portions into the aperture and upon release thereof opposite pairs of feet resiliently engage opposite edge portions of the panel aperture with the plate-like feet arranged on one side of the panel and the inwardly projecting extensions of the arms disposed on the opposite side of the panel.

References Cited in the file of this patent

UNITED STATES PATENTS

| | | |
|---|---|---|
| 2,173,198 | Churchill | Sept. 19, 1939 |
| 2,385,893 | Taylor | Oct. 2, 1945 |
| 2,391,046 | Tinnerman | Dec. 18, 1945 |
| 2,516,274 | Tinnerman | July 25, 1950 |
| 2,639,311 | Cook | May 19, 1953 |
| 2,668,998 | Tinnerman | Feb. 16, 1954 |